(12) United States Patent
Ningrat et al.

(10) Patent No.: US 10,936,119 B2
(45) Date of Patent: Mar. 2, 2021

(54) SELF CAPACITANCE SENSING BASED ON TANGENT OF PHASE SHIFT OF DRIVE SIGNAL

(71) Applicant: STMicroelectronics Asia Pacific Pte Ltd, Singapore (SG)

(72) Inventors: Kusuma Adi Ningrat, Singapore (SG); Ade Putra, Singapore (SG)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 0 days.

(21) Appl. No.: 16/788,417

(22) Filed: Feb. 12, 2020

(65) Prior Publication Data

US 2020/0285384 A1 Sep. 10, 2020

Related U.S. Application Data

(60) Provisional application No. 62/813,862, filed on Mar. 5, 2019.

(51) Int. Cl.
*G06F 3/041* (2006.01)
*G06F 3/044* (2006.01)
(52) U.S. Cl.
CPC ...... *G06F 3/041662* (2019.05); *G06F 3/0446* (2019.05)
(58) Field of Classification Search
None
See application file for complete search history.

(56) References Cited

U.S. PATENT DOCUMENTS

| 9,489,093 | B2 * | 11/2016 | Gossner | G06F 3/04184 |
| 2014/0327644 | A1 * | 11/2014 | Mohindra | G06F 3/0416 |
| | | | | 345/174 |
| 2017/0199022 | A1 * | 7/2017 | Anderson | G06F 3/0445 |
| 2017/0343386 | A1 | 11/2017 | Tanaka et al. | |

(Continued)

FOREIGN PATENT DOCUMENTS

CN 108107273 A 6/2018

OTHER PUBLICATIONS

Madaan, Pushek et al: "Capacitive Sensing Made Easy, Part 1: An Introduction to Different Capacitive Sensing Technologies," Cypress Perform, Published in EE Times Name (http://www.eetimes.com); Apr. 2012, 8 pages.

(Continued)

*Primary Examiner* — Christopher J Kohlman
(74) *Attorney, Agent, or Firm* — Crowe & Dunlevy

(57) ABSTRACT

A touch screen controller includes driving circuitry coupled to a conductive line through a resistance and drives that conductive line with a driving signal passed through the resistance at a drive frequency. Sensing circuitry is coupled to that conductive line and senses a voltage at that conductive line, the voltage being a function of a capacitance seen by that conductive line. Analog to digital conversion circuitry is coupled to the sensing circuitry and samples the sensed voltage at a sampling frequency to produce samples. Processing circuitry is coupled to the analog to digital conversion circuitry and directly calculates a tangent of a phase shift of the voltage due to the resistance and the capacitance from the samples, and determines a self touch value for that conductive line as a function of the tangent of the phase shift of the voltage.

22 Claims, 6 Drawing Sheets

(56) References Cited

U.S. PATENT DOCUMENTS

2017/0371444 A9* 12/2017 Chao ............... G06F 3/044
2018/0074641 A1* 3/2018 Tanaka ............. G06F 3/0416
2018/0329563 A1* 11/2018 Han ................ G06F 3/04162

OTHER PUBLICATIONS

ROJ, Jerzy et al: "Method of Measurement of Capacitance and Dielectric Loss Factor Using Artificial Neural Networks," Measurement Science Review, vol. 15, No. 3, 2015, pp. 127-131.

* cited by examiner

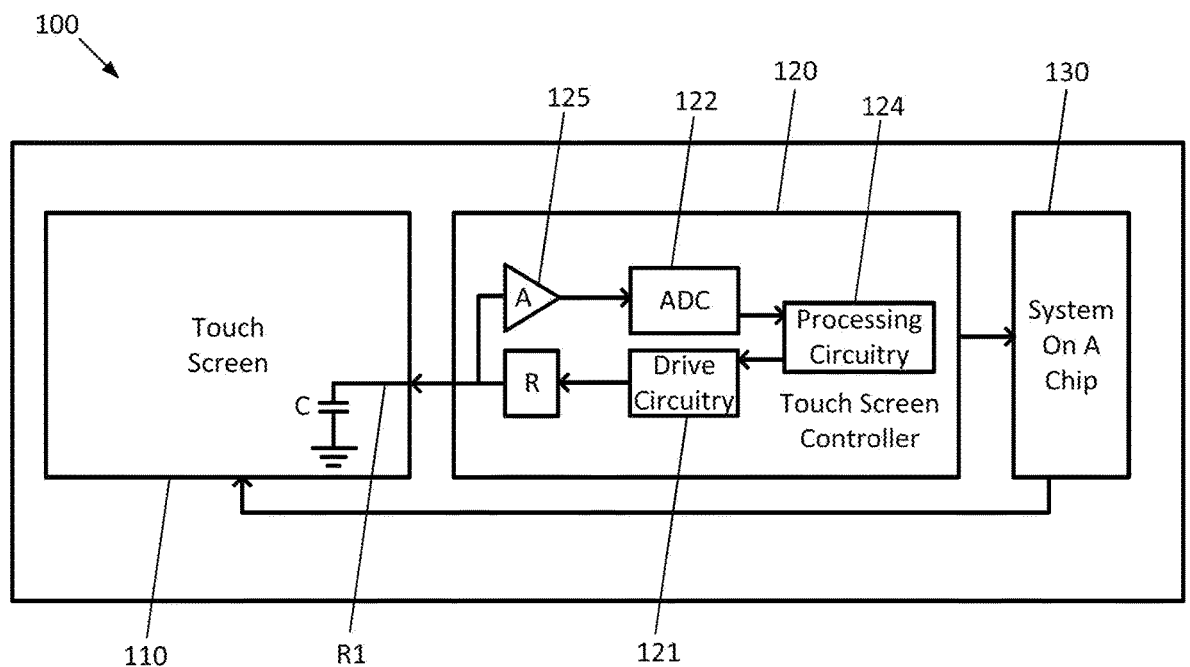
FIG. 1
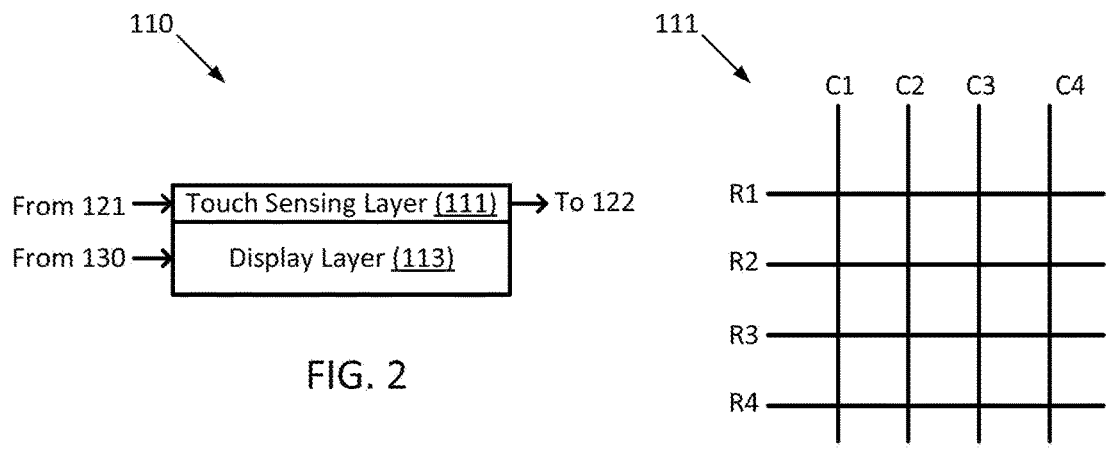
FIG. 2
FIG. 3

SELF CAPACITANCE SENSING BASED ON TANGENT OF PHASE SHIFT OF DRIVE SIGNAL

CROSS-REFERENCE TO RELATED APPLICATION

This application claims priority to U.S. Provisional Application No. 62/813,862, filed Mar. 5, 2019, the contents of which are incorporated by reference in their entirety.

TECHNICAL FIELD

This disclosure is directed to the field of self capacitance sensing and, in particular, to hardware and techniques for operating that hardware without the use of switched capacitor circuits.

BACKGROUND

Touch screen devices are prevalent in today's computing environment. Portable computers, desktop computers, tablets, smart phones, and smartwatches typically employ a touch screen to gain user input for navigation and control of these devices. Thus, discerning the intent of the user via touch inputs is an important feature of a touch screen device.

Touch screens typically operate based on capacitive touch sensing, and include a patterned array of conductive features. For instance, the patterned array of conductive features may include sets of lines, conductive pads, overlapping structures, interleaved structures, diamond structures, lattice structures, and the like. By evaluating changes in capacitance at different lines or sets of lines, a user touch or hover, such as by a finger or stylus, can be detected.

Two common capacitive touch sensing techniques or modes that may be performed on touch screens are mutual capacitance sensing and self capacitance sensing. In a mutual self capacitance sensing mode, a drive signal is applied to a subset of the lines referred to as drive lines, and capacitance values are measured at a subset of the lines referred to as sense lines, with it being understood that the sense lines cross the drive lines in a spaced apart fashion therefrom. Each crossing of drive line and sense line forms a capacitive node. Since bringing a finger or conductive stylus near the surface of the touch screen changes the local electric field, this causes a reduction in the capacitance between the drive lines and the sense lines (the "mutual" capacitance), and the capacitance change at every individual capacitive node can be measured to accurately determine the touch location. Therefore, the output of mutual capacitance sensing is a two-dimensional matrix of values, with one value for each capacitive node (crossing between drive line and sense line). Thus, it can be appreciated that mutual capacitance sensing allows multi-touch operation where multiple fingers or styli can be accurately tracked at the same time.

However, as can also be appreciated, the signal to noise ratio when measuring a single capacitive node is low. Therefore, the sensitivity of mutual touch sensing is not ideal for some situations.

In a self capacitance sensing mode, the drive signal is applied to every line, regardless of orientation. Bringing a finger or conductive stylus near the surface of the touch screen changes the local electric field, increasing the capacitance between the drive line or sense line of interest and ground (the "self capacitance") in this instance. However, since all lines are driven, the capacitance change can only be measured on a per line basis as opposed to a per capacitive node basis. Therefore, the output of self capacitance sensing is two one dimensional arrays of values, with one value for each line.

As can be appreciated, the signal to noise ratio when measuring an entire line is higher than when measuring a single capacitive node, and therefore self capacitance sensing allows for more precise measurements, albeit with an inability to resolve touches by more than a single finger accurately.

With current self capacitance sensing designs, only one data acquisition can be performed during each period of the drive signal. In addition, since total charge per line is measured, and since the signal to noise ratio is high, associated sensing circuitry requires a large working range. Still further, switching the drive frequency for a given touch screen design is difficult, as functions performed by the associated sensing circuitry, such as compensation for large voltage swing caused by the signal to noise ratio, may be different for different touch screen designs.

Therefore, due to the usefulness of self capacitance sensing but the drawbacks given above, new circuitry and techniques for performing self capacitance sensing are desired.

SUMMARY

A first aspect is directed to a touch screen controller including driving circuitry coupled to a conductive line through a resistance and configured to drive that conductive line with a driving signal forced through the resistance at a drive frequency, and sensing circuitry coupled to that conductive line and configured to sense a voltage at that conductive line, the voltage being a function of a capacitance seen by that conductive line. Analog to digital conversion circuitry is coupled to the sensing circuitry and configured to sample the sensed voltage at a sampling frequency to produce samples. Processing circuitry is coupled to the analog to digital conversion circuitry and configured to directly calculate a tangent of a phase shift of the voltage due to the resistance and the capacitance from the samples and determine a self touch value for that conductive line as a function of the tangent of the phase shift of the voltage.

The sampling frequency may be greater than the drive frequency.

The sampling frequency may be fixed.

The processing circuitry may be configured to directly calculate the tangent of the phase shift of the voltage by performing a Fast Fourier Transform (FFT) as a function of the drive frequency to determine real and imaginary components of a signal represented by the samples, and determining the tangent of the phase shift of the voltage as a ratio of the real component of the signal represented by the samples to the imaginary component of the signal represented by the samples.

The processing circuitry may be configured to directly calculate the tangent of the phase shift of the voltage by multiplying the samples by a real multiplier and by an imaginary multiplier, summing the samples after multiplication to produce the signal represented by the samples, determining real and imaginary components of the signal represented by the samples, and determining the tangent of the phase shift of the voltage as the ratio of the real and imaginary components of the signal represented by the samples.

The processing circuitry may perform the FFT by calculating the signal S represented by the samples at the drive frequency K as:

$$S(k) = \sum_{n=0}^{N} s(n) * e^{-j\frac{2\pi kn}{N}}.$$

The processing circuitry may perform the FFT by calculating the signal S represented by the samples at the drive frequency K as:

$$S(k) = \sum_{n=0}^{N} s(n) * e^{-j\frac{2\pi kn}{N}} = \sum_{n=0}^{N} s(n) * \left(\cos\left(\frac{2\pi kn}{N}\right) - j * \sin\left(\frac{2\pi kn}{N}\right)\right)$$

with the real component comprised of resulting expressions involving cos and the imagine component comprised of resulting expressing involving sin.

The processing circuitry may determine the self touch value as:

tan(Δphase)=$2\pi f(C_1-C_0)$.

Another aspect herein is a method of self capacitance sensing on a touch screen. The method includes driving a plurality of conductive lines with a drive signal forced through a resistance at a drive frequency. For each of the plurality of conductive lines, during a single self sensing frame, the method includes sampling a voltage at that conductive line at a sampling frequency to produce samples, the voltage being a function of a capacitance seen by that conductive line, directly calculating a tangent of a phase shift of the voltage due to the resistance and capacitance from the samples, and determining a self touch value for that conductive line during the self sensing frame as a function of the tangent of the phase shift of the voltage.

The sampling frequency may be greater than the drive frequency.

The sampling frequency may be fixed.

The tangent of the phase shift of the voltage may be directly calculated by performing a Fast Fourier Transform (FFT) as a function of the drive frequency to determine real and imaginary components of a signal represented by the samples, and calculating the tangent of the phase shift of the voltage as a ratio of the real component of the signal represented by the samples to the imaginary component of the signal represented by the samples.

The tangent of the phase shift of the voltage may be determined by multiplying the samples by a real multiplier and by an imaginary multiplier, summing the samples after multiplication to produce the signal represented by the samples, determining real and imaginary components of the signal represented by the samples, and calculating the tangent of the phase shift of the voltage as the ratio of the real and imaginary components of the signal represented by the samples.

Performing the FFT may include calculating the signal S represented by the samples at the drive frequency K as:

$$S(k) = \sum_{n=0}^{N} s(n) * e^{-j\frac{2\pi kn}{N}}.$$

Performing the FFT may include calculating the signal S represented by the samples at the drive frequency K as:

$$S(k) = \sum_{n=0}^{N} s(n) x e^{-j\frac{2\pi kn}{N}} = \sum_{n=0}^{N} s(n) * \left(\cos\left(\frac{2\pi kn}{N}\right) - j * \sin\left(\frac{2\pi kn}{N}\right)\right)$$

with the real component comprised of resulting expressions involving cos and the imagine component comprised of resulting expressing involving sin.

The self touch value may be determined as:

tan(Δphase)=$2\pi f(C_1-C_0)$.

Also disclosed herein is a touch screen controller including driving circuitry coupled to a conductive line and configured to drive that conductive line, and sensing circuitry coupled to that conductive line and configured to sense a voltage at that conductive line, the voltage being a function of a capacitance seen by that conductive line. The touch screen controller also includes analog to digital conversion circuitry coupled to the sensing circuitry and configured to sample the sensed voltage to produce samples, and processing circuitry configured to determine a self touch value for that conductive line as a function of a tangent of a phase shift of the voltage.

The processing circuitry may be configured to directly calculate the tangent of the phase shift of the voltage by performing a Fast Fourier Transform (FFT) to determine real and imaginary components of a signal represented by the samples, and determining the tangent of the phase shift of the voltage as a ratio of the real component of the signal represented by the samples to the imaginary component of the signal represented by the samples.

The processing circuitry may be configured to directly calculate the tangent of the phase shift of the voltage by multiplying the samples by a real multiplier and by an imaginary multiplier, summing the samples after multiplication to produce the signal represented by the samples, determining real and imaginary components of the signal represented by the samples, and determining the tangent of the phase shift of the voltage as the ratio of the real and imaginary components of the signal represented by the samples.

Also disclosed herein is a method of touch sensing on a touch screen. The method includes driving conductive lines with a drive signal. The method also includes, for each of the conductive lines, during a single touch sensing frame, sampling a voltage at that conductive line to produce samples, the voltage being a function of a capacitance seen by that conductive line, directly calculating a tangent of a phase shift of the voltage due to the capacitance from the samples, and determining a touch value for that conductive line during the single touch sensing frame as a function of the tangent of the phase shift of the voltage.

The tangent of the phase shift of the voltage may be directly calculated by performing a Fast Fourier Transform (FFT) to determine real and imaginary components of a signal represented by the samples, and calculating the tangent of the phase shift of the voltage as a ratio of the real component of the signal represented by the samples to the imaginary component of the signal represented by the samples.

The tangent of the phase shift of the voltage may be determined by multiplying the samples by a real multiplier and by an imaginary multiplier, summing the samples after multiplication to produce the signal represented by the samples, and calculating the tangent of the phase shift of the voltage as the ratio of the real and imaginary components of the signal represented by the samples.

BRIEF DESCRIPTION OF THE DRAWINGS

FIG. 1 is a block diagram of a touch screen device disclosed herein.

FIG. 2 is a cross sectional view of the touch screen of the touch screen device of FIG. 1.

FIG. 3 is a diagram of the conductive columns and lines of the touch screen of FIGS. 1-2.

DETAILED DESCRIPTION

Figure 4:
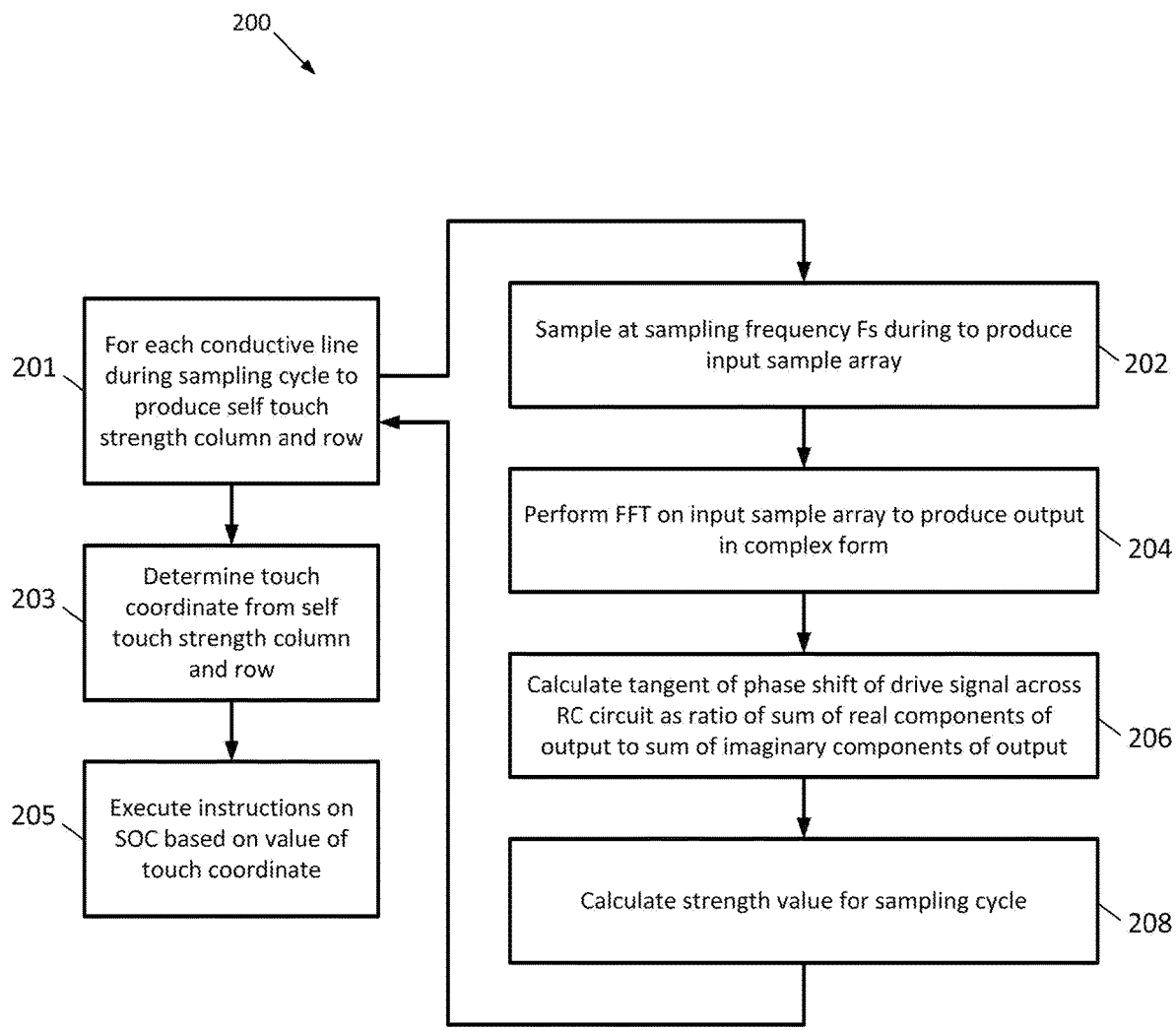
FIG. 4 is a flowchart of a method of operating the touch screen device of FIG. 1 for self capacitance sensing.

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein.

FIG. 1 is a functional block diagram of a touch screen device 100 according to an embodiment as disclosed herein. The touch screen device 100 may be a smartphone, tablet, portable computer, smartwatch, wearable, or other device. The touch screen device 100 includes a tactile input surface, such as a touch screen display 110, coupled to a touch screen controller 120, which in turn is coupled to a system on a chip (SOC) 130. The touch screen display 110 is designed to receive touch inputs from a user through a user's fingers or a stylus.

The touch screen display 110 includes a display layer 113 and a touch sensing layer 111 (shown in FIG. 2) on the display layer 113 or spaced apart therefrom by another layer (not shown). The touch sensing layer 111 is comprised of parallel conductive rows (Rx) crossed by parallel conductive columns (Cy) (shown in FIG. 3). This crossing is in a spaced apart fashion such that the conductive rows do not make physical contact with the conductive columns. Although parallel conductive rows and columns are shown and described, in some applications, other shapes may be used, and this disclosure is in no way constrained by the shape of the columns and rows, or by the columns and rows actually being columns and rows in the standard sense (e.g., they may be diagonally oriented with respect to the display layer 113, may cross each other at oblique or obtuse angles, etc.).

Note that in FIG. 1, for simplicity, but one conductive line, row R1, is shown. Also note that but one instance of drive circuitry 121, resistance R, amplifier 125, and ADC 122 are shown are shown for simplicity. However, note that, in actuality, the touch screen 110 in FIG. 1 contains any number of conductive rows and columns, as shown in the touch sensing layer 111 of FIG. 3. Also note that, in actuality, for each instance of a conductive row and conductive column, there may be a drive circuitry, resistance, amplifier, and ADC. These may be present on a matched basis such that each conductive row and each conductive column has its own drive circuitry, resistance, amplifier, and ADC, or two or more rows (or two or more columns) may share a drive circuitry, resistance, amplifier, and ADC using a switching matrix (not shown).

Drive circuitry 121, under control of processing circuitry 124, generates a periodic drive signal (square wave or sine wave) and passes it to the conductive row R1 through a resistance R. Note that a capacitance C is formed between the conductive row R1 and ground, and that this capacitance C changes based on proximity of a user's finger or a stylus to the conductive row R1. Also note that resistance R and capacitance C therefore form an RC circuit, and that amplifier 125 is coupled to conductive row R1 to receive input from the center tap of the RC circuit formed by resistance R and capacitance C.

Amplifier 125 is directly electrically coupled to row R1, and amplifies and preprocesses the signal at row R1. Analog to digital converter (ADC) 122 receives the signal from the amplifier 125 and digitizes that signal. Note that the sampling frequency of the ADC 122 is greater than the frequency of the drive signal.

Processing circuitry 124 receives the digitized signal from the ADC 122, and from that digitized signal calculates a self capacitance strength value (referred to hereinafter simply as a strength value) for row R1 during each sampling cycle. Calculated strength values are directly passed to SOC 130 by the processing circuitry 124, or the processing circuitry 124 determines coordinates of a touch to the touch screen 110 from all the strength values calculated during each sampling cycle (keeping in mind that while only a single row R1 was shown in FIG. 1, in actuality there are many rows and columns in the touch screen 110, and a single strength value for each row and for each column are determined during each sampling cycle) and passes the coordinates to the SOC 130. From the received data (whether it be strength values or a coordinate or coordinates), the SOC 130 then takes action.

This operation is now described fully with additional reference to flowchart 200 of FIG. 4. Step 201 is comprised of sub-steps 202, 204, 206, and 208, which are performed for each conductive row and each conductive column of the touch screen 110 during a single sampling cycle.

As the drive circuitry 121 generates the periodic drive signal, the ADC 122 samples a conductive line (e.g., R1) a given number of times at a sampling frequency Fs that is higher than the frequency of the periodic drive sign to produce an input sample array (Block 202). Then, a Fast Fourier Transform (FFT) is performed on the input sample array to produce output in a complex form (Block 204).

Note that the transfer function of the RC circuit formed by resistance R and capacitance C is:

$$\frac{1 - j2\pi fRC}{1 + 4\pi^2 f^2 R^2 C^2}$$

From this transfer function, the tangent of the phase shift of the signal across the RC circuit is known to be $2\pi fRC$. Therefore, by keeping the frequency f of the drive signal as well as the value of the resistance R fixed, if the tangent of the phase shift can be calculated, then the value of the capacitance C during the sampling cycle can be determined—keep in mind that the value of the capacitance C changes based upon proximity or touch of a finger or stylus to the touch screen 110. Mathematically, this can be represented as:

$$\tan(\Delta\text{phase}) = 2\pi f(C_1 - C_0)$$

with $C_1 - C_0$ representing the change in capacitance to C resulting from the touch or proximity of the finger or stylus.

The FFT of the signal across the RC circuit can be represented mathematically as:

$$S(k) = \sum_{n=0}^{N} s(n) x e^{-j\frac{2\pi kn}{N}}$$

where k is equal to the frequency of the drive signal.

This can be expanded into complex form as:

$$\sum_{n=0}^{N} s(n) * \left( \cos\left(\frac{2\pi kn}{N}\right) - j * \sin\left(\frac{2\pi kn}{N}\right) \right)$$

Note that resulting terms containing the cosine multiplier are real components of the signal across the RC circuit and that terms containing the sine multiplier are imaginary components of the signal across the RC circuit.

The tangent of the phase shift of the signal across the RC circuit can be calculated as a ratio of a sum of the real components of S(k) to a sum of the imaginary components of S(k) (Block 206). Mathematically, this can be represented as:

$$\tan(\Delta\text{phase}) = \frac{\text{sum of real components of } S(k)}{\text{sum of imaginary components of } S(k)}$$

Therefore, at this point, since the tangent of the phase shift of the signal across the RC circuit is known, since the frequency f is known, and since the resistance R is known, the value of capacitance C during the sampling cycle can be calculated as:

$$c = \frac{\tan(\Delta\text{phase})}{2\pi fR}$$

From the calculated value of the capacitance C, a capacitance change resulting from the touch or proximity of the finger or stylus to the touch screen 110 can be determined, and from that change, a strength value for the conductive row or conductive column under evaluation can then be determined (Block 208). Note that Blocks 202, 204, 206, and 208 are repeated once for each conductive row and conductive column during the sampling cycle so as to produce a strength value for each conductive row and each conductive column.

Using these strength values determined during Block 201, a self capacitance touch coordinate can be calculated (Block 203), and the SOC 130 can execute instructions based on this touch coordinate (Block 205). Note that these instructions can be to launch an application, alter operation of an application, provide input to an application, to change some aspect of the user interface, etc.

This design of the touch screen controller 120 coupled with the operation of the touch screen controller 120 represents an advancement in touch screen technology and, in particular, an advancement in self capacitance sensing technology. With prior art designs, there is but one single data point per conductive line per sampling cycle, with the result being that the working range of such designs must be large or that such designs utilize a compensation circuit. Still further, prior art designs require performance of a self tuning process. As an improvement, the touch screen controller 120 in operation acquires sufficient data points per conductive line per sampling cycle to enable FFT analysis, yielding more accurate results, and eliminating the need for a large working range, the use of compensation circuits, and the need for a self tuning process. These improvements therefore represent a substantial improvement in touch screen and self capacitance sensing, and allow for greater accuracy. This greater accuracy in turn improves the user interface experience of the touch screen device 100 utilizing the touch screen controller 120, rendering the touch screen device 100 particularly commercially desirable.

Also note that the steps described in the flowchart 200 can be considered to be rules that, when followed, enable the determination of self capacitance touch values without the use of switched capacitor circuits, which was previously not possible.

Figure 5:
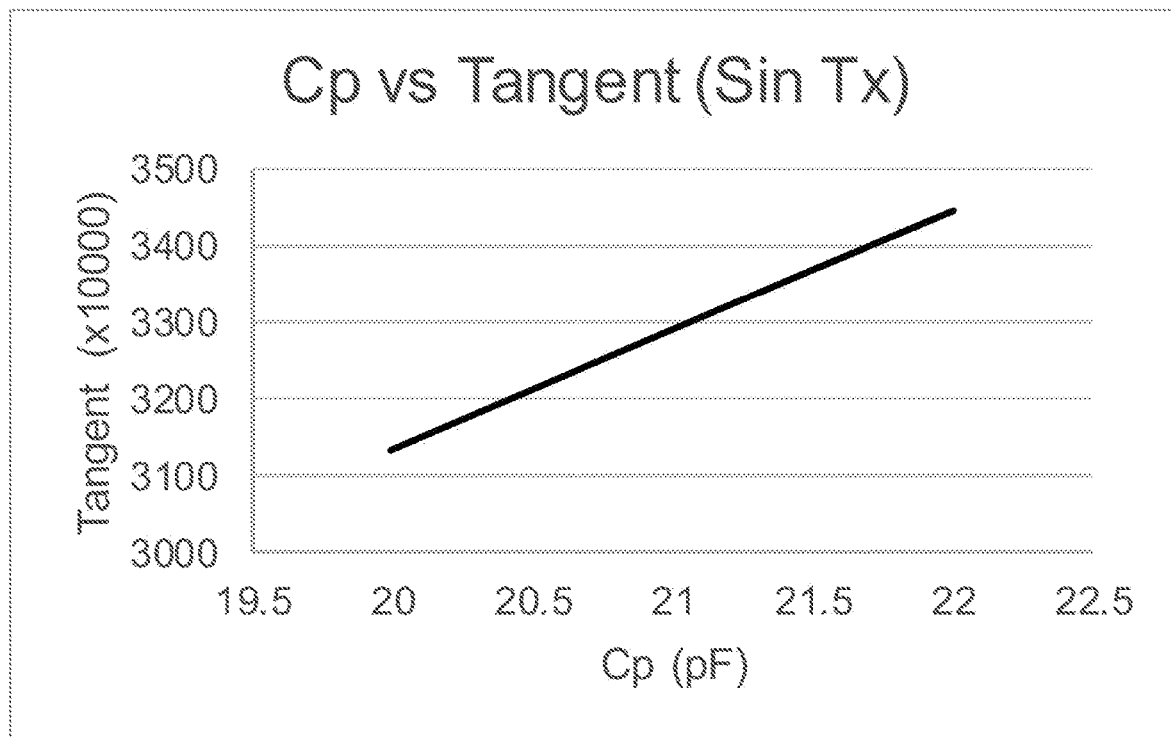
FIG. 5 is a first graph of capacitance value of the capacitance of the RC circuit of FIG. 1 versus the tangent of a phase shift of the voltage across the RC circuit for a sine wave drive signal, in an ideal case.
Figure 6:
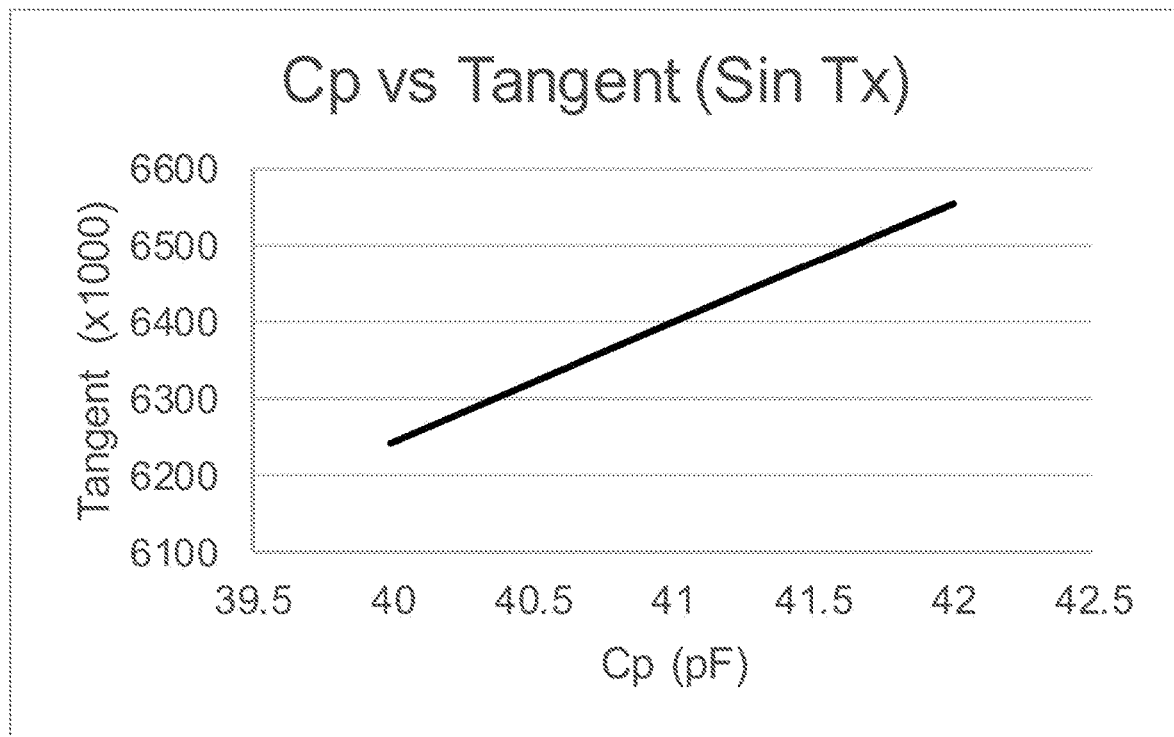
FIG. 6 is a second graph of capacitance value of the capacitance of the RC circuit of FIG. 1 versus the tangent of a phase shift of the voltage across the RC circuit for a sine wave drive signal, in an ideal case.

Graphs of the value of the change in capacitance (with the change noted as Cp) versus the value of the tangent of the phase shift of the signal in an ideal case are shown in FIGS. 5-8. In FIG. 5, the outcome of performing of steps 204 and 206, when the drive signal is a 250 kHz sine wave, when C has a starting value of 20 pF, and when R has a value of 10 kΩ, is shown in an ideal case. In FIG. 6, the outcome of performing of steps 204 and 206, when the drive signal is a 250 kHz sine wave, when C has a starting value of 40 pF, and when R has a value of 10 kΩ, is shown in an ideal case. Note that, as predicted by the mathematical expressions described above, the change in tangent with linear to the change in capacitance C (with the change noted as Cp). Thus, the techniques described herein are validated.

Figure 7:
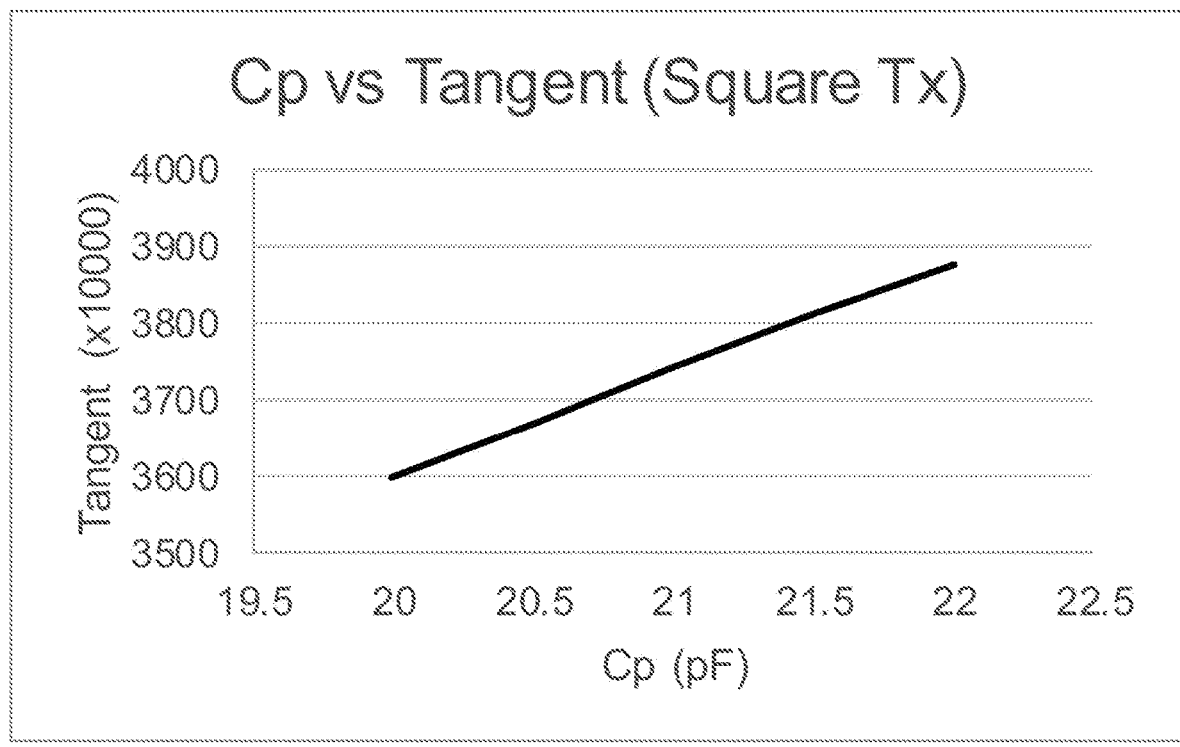
FIG. 7 is a first graph of capacitance value of the capacitance of the RC circuit of FIG. 1 versus the tangent of a phase shift of the voltage across the RC circuit for a square wave drive signal, in an ideal case.
Figure 8:
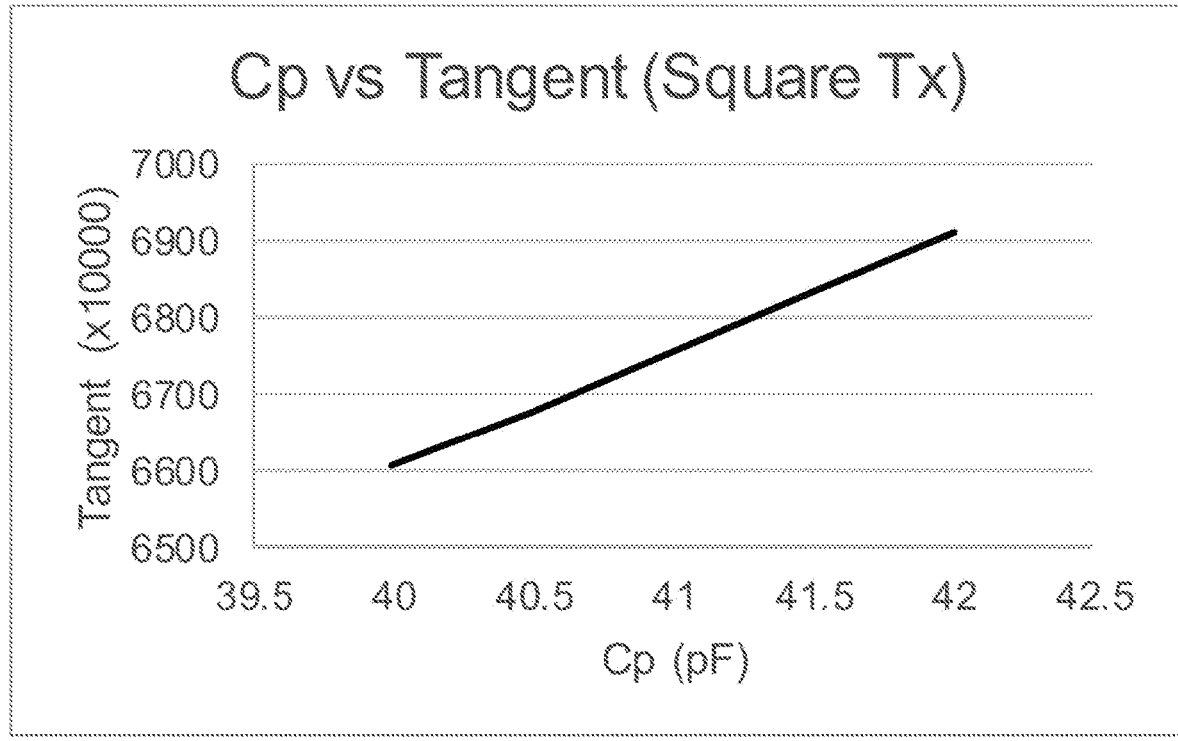
FIG. 8 is a second graph of capacitance value of the capacitance of the RC circuit of FIG. 1 versus the tangent of a phase shift of the voltage across the RC circuit for a square wave drive signal, in an ideal case.

In FIG. 7, the outcome of performing of steps 204 and 206, when the drive signal is a 250 kHz square wave, when C has a starting value of 20 pF, and when R has a value of 10 kΩ, is shown in an ideal case. In FIG. 8, the outcome of performing of steps 204 and 206, when the drive signal is a 250 kHz square wave, when C has a starting value of 40 pF, and when R has a value of 10 kΩ, is shown in an ideal case. Note that linearity is not affected by the use of a square wave as a drive signal, and that there is only a slight effect on the slope of the line as Cp changes.

Figure 9:
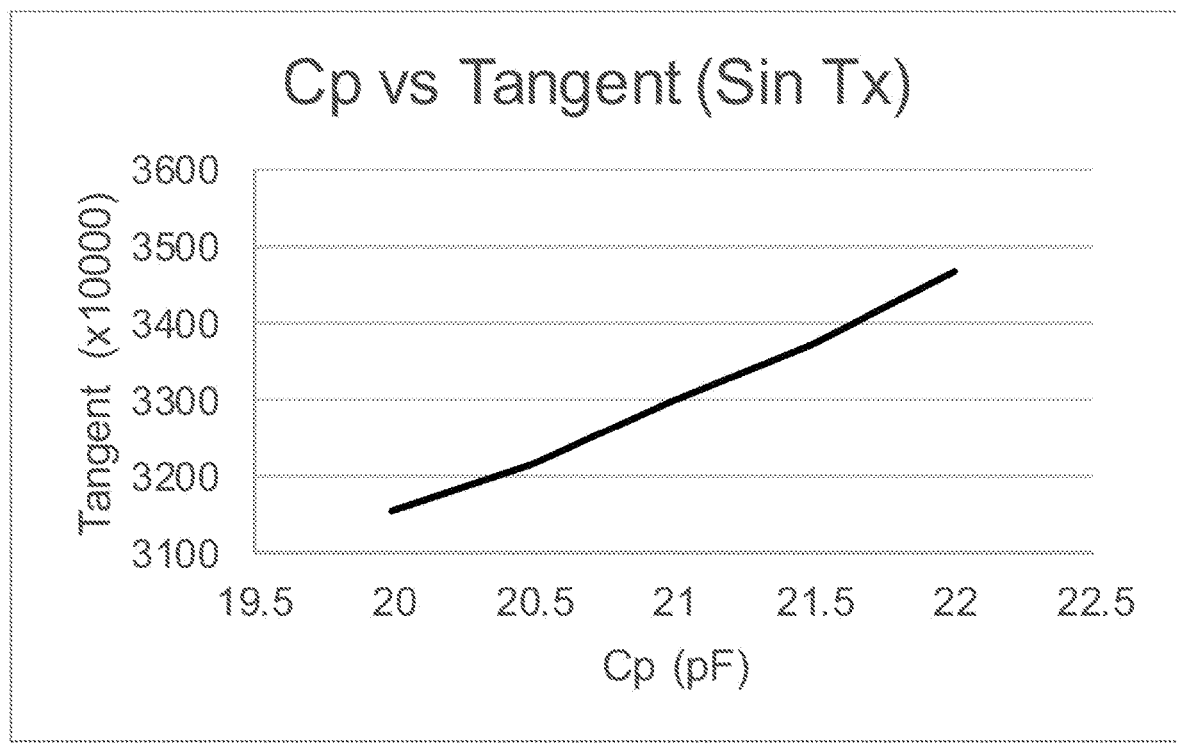
FIG. 9 is a first graph of capacitance value of the capacitance of the RC circuit of FIG. 1 versus the tangent of a phase shift of the voltage across the RC circuit for a sine wave drive signal, in a real case.
Figure 10:
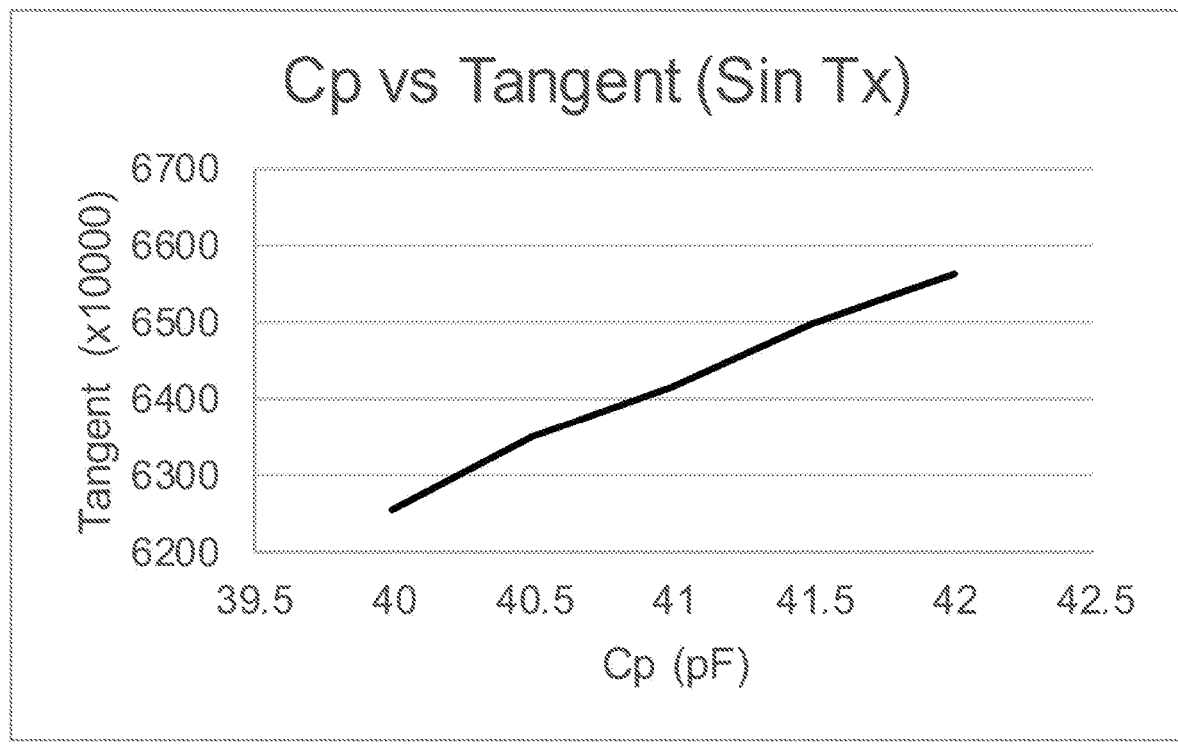
FIG. 10 is a second graph of capacitance value of the capacitance of the RC circuit of FIG. 1 versus the tangent of a phase shift of the voltage across the RC circuit for a sine wave drive signal, in a real case.

In FIG. 9, the outcome of performing of steps 204 and 206, when the drive signal is a 250 kHz sine wave, when C has a starting value of 20 pF, and when R has a value of 10 kΩ, is shown in a real world case. In FIG. 10, the outcome of performing of steps 204 and 206, when the drive signal is a 250 kHz sine wave, when C has a starting value of 40 pF, and when R has a value of 10 kΩ, is shown in a real world case. Note that, once again, some degree of non-linearity is introduced to the line by quantization error in the digital processing performed, but it is not sufficient to render the results inaccurate or not useful.

Figure 11:
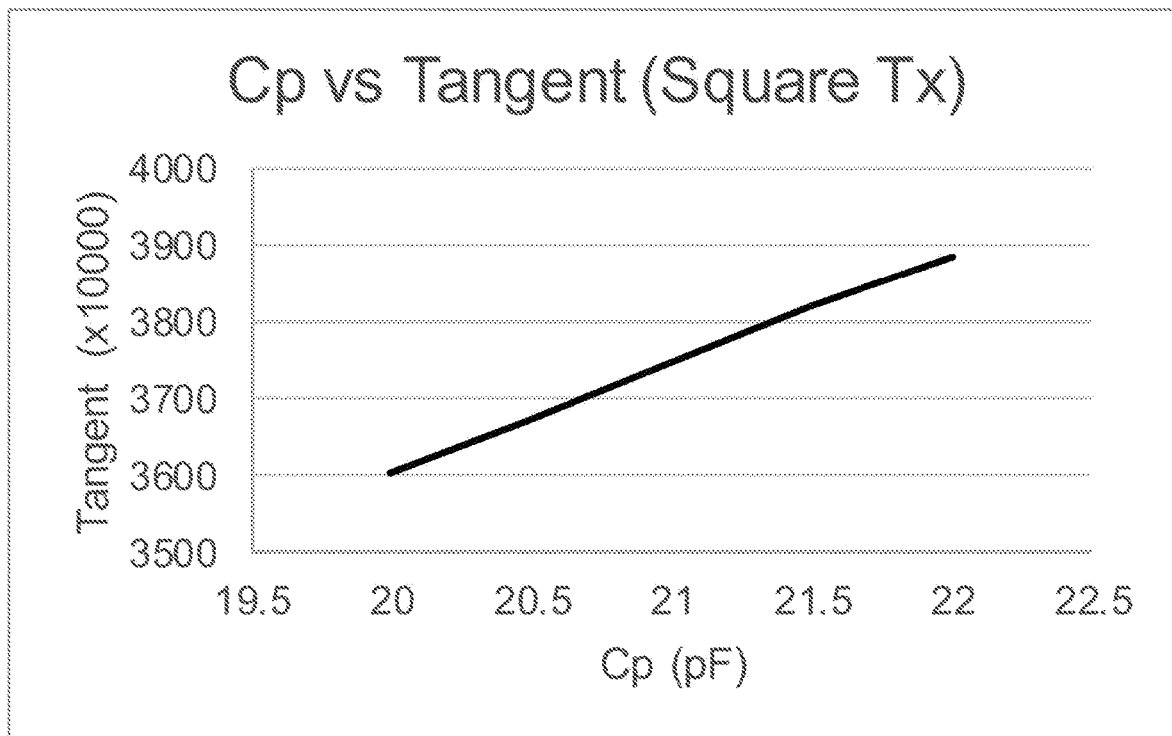
FIG. 11 is a first graph of capacitance value of the capacitance of the RC circuit of FIG. 1 versus the tangent of a phase shift of the voltage across the RC circuit for a square wave drive signal, in a real case.
Figure 12:
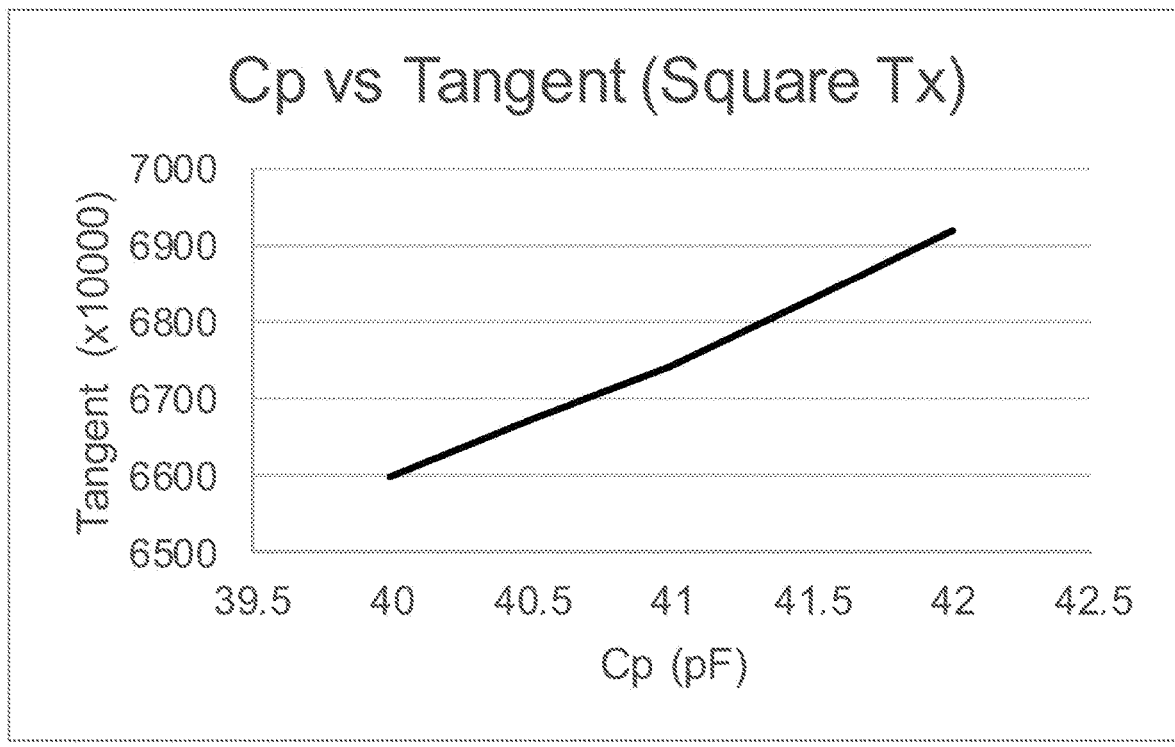
FIG. 12 is a second graph of capacitance value of the capacitance of the RC circuit of FIG. 1 versus the tangent of a phase shift of the voltage across the RC circuit for a square wave drive signal, in a real case.

In FIG. 11, the outcome of performing of steps 204 and 206, when the drive signal is a 250 kHz square wave, when C has a starting value of 20 pF, and when R has a value of 10 kΩ, is shown in a real world case. In FIG. 12, the outcome of performing of steps 204 and 206, when the drive signal is a 250 kHz square wave, when C has a starting value of 40 pF, and when R has a value of 10 kΩ, is shown in a real world case. Note that, some degree of non-linearity is introduced to the line by quantization error in the digital processing performed, but it is not sufficient to render the results inaccurate or not useful.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A touch screen controller, comprising:
    driving circuitry coupled to a conductive line through a resistance and configured to drive that conductive line with a driving signal passed through the resistance at a drive frequency;
    sensing circuitry coupled to that conductive line and configured to sense a voltage at that conductive line, the voltage being a function of a capacitance of that conductive line;
    analog to digital conversion circuitry coupled to the sensing circuitry and configured to sample the sensed voltage at a sampling frequency to produce samples; and
    processing circuitry coupled to the analog to digital conversion circuitry and configured to:
        directly calculate, from the samples, a tangent of a phase shift of the voltage due to the resistance and the capacitance; and
        determine a self touch value for that conductive line as a function of the tangent of the phase shift of the voltage.

2. The touch screen controller of claim 1, wherein the sampling frequency is greater than the drive frequency.

3. The touch screen controller of claim 1, wherein the sampling frequency is fixed.

4. The touch screen controller of claim 1, wherein the processing circuitry is configured to directly calculate the tangent of the phase shift of the voltage by:
    performing a Fast Fourier Transform (FFT) as a function of the drive frequency to determine real and imaginary components of a signal represented by the samples; and
    determining the tangent of the phase shift of the voltage as a ratio of the real component of the signal represented by the samples to the imaginary component of the signal represented by the samples.

5. The touch screen controller of claim 4, wherein the processing circuitry is configured to directly calculate the tangent of the phase shift of the voltage by:
    multiplying the samples by a real multiplier and by an imaginary multiplier;
    summing the samples after multiplication to produce the signal represented by the samples;
    determining real and imaginary components of the signal represented by the samples; and
    determining the tangent of the phase shift of the voltage as the ratio of the real and imaginary components of the signal represented by the samples.

6. The touch screen controller of claim 4, wherein the processing circuitry performs the FFT by calculating the signal S represented by the samples at a frequency k of the drive signal as:

$$S(k) = \sum_{n=0}^{N} s(n) * e^{-j\frac{2\pi k n}{N}}.$$

7. The touch screen controller of claim 4, wherein the processing circuitry performs the FFT by calculating the signal S represented by the samples at the drive frequency k as:

$$S(k) = \sum_{n=0}^{N} s(n) * e^{-j\frac{2\pi k n}{N}} = \sum_{n=0}^{N} s(n) * \left(\cos\left(\frac{2\pi k n}{N}\right) - j * \sin\left(\frac{2\pi k n}{N}\right)\right)$$

with the real component comprised of resulting expressions involving cosine and the imaginary component comprised of resulting expressions involving sine.

8. The touch screen controller of claim 1, wherein the processing circuitry determines the self touch value as:

$$\tan(\Delta phase) = 2\pi f(C_1 - C_0),$$

wherein $C_1 - C_0$ represents a change in capacitance of the conductive line and f is the drive frequency.

9. A method of self capacitance sensing on a touch screen, the method comprising:
    driving a plurality of conductive lines with a drive signal forced through a resistance at a drive frequency; and
    for each of the plurality of conductive lines, during a single self sensing frame:
        sampling a voltage at that conductive line at a sampling frequency to produce samples, the voltage being a function of a capacitance of that conductive line;
        directly calculating, from the samples, a tangent of a phase shift of the voltage due to the resistance and capacitance; and
        determining a self touch value for that conductive line during the single self sensing frame as a function of the tangent of the phase shift of the voltage.

10. The method of claim 9, wherein the sampling frequency is greater than the drive frequency.

11. The method of claim 9, wherein the sampling frequency is fixed.

12. The method of claim 9, wherein the tangent of the phase shift of the voltage is directly calculated by:
performing a Fast Fourier Transform (FFT) as a function of the drive frequency to determine real and imaginary components of a signal represented by the samples; and
calculating the tangent of the phase shift of the voltage as a ratio of the real component of the signal represented by the samples to the imaginary component of the signal represented by the samples.

13. The method of claim 12, wherein the tangent of the phase shift of the voltage is determined by:
multiplying the samples by a real multiplier and by an imaginary multiplier;
summing the samples after multiplication to produce the signal represented by the samples;
determining real and imaginary components of the signal represented by the samples; and
calculating the tangent of the phase shift of the voltage as the ratio of the real and imaginary components of the signal represented by the samples.

14. The method of claim 12, wherein performing the FFT comprises calculating the signal S represented by the samples at the drive frequency k as:

$$S(k) = \sum_{n=0}^{N} s(n) * e^{-j\frac{2\pi k n}{N}}.$$

15. The method of claim 12, wherein performing the FFT comprises calculating the signal S represented by the samples at the drive frequency k as:

$$S(k) = \sum_{n=0}^{N} s(n) x e^{-j\frac{2\pi k n}{N}} = \sum_{n=0}^{N} s(n) * \left( \cos\left(\frac{2\pi k n}{N}\right) - j * \sin\left(\frac{2\pi k n}{N}\right) \right)$$

with the real component comprised of resulting expressions involving cosine and the imaginary component comprised of resulting expressions involving sine.

16. The method of claim 9, wherein the self touch value is determined as:

$\tan(\Delta\text{phase}) = 2\pi f (C_1 - C_0)$, wherein $C_1 - C_0$ represents a change in capacitance of the conductive line and f is the drive frequency.

17. A touch screen controller, comprising:
driving circuitry coupled to a conductive line and configured to drive that conductive line;
sensing circuitry coupled to that conductive line and configured to sense a voltage at that conductive line, the voltage being a function of a capacitance seen by that conductive line;
analog to digital conversion circuitry coupled to the sensing circuitry and configured to sample the sensed voltage to produce samples; and
processing circuitry configured to determine a self touch value for that conductive line as a function of a tangent of a phase shift of the sensed voltage based upon the samples.

18. The touch screen controller of claim 17, wherein the processing circuitry is configured to directly calculate the tangent of the phase shift of the voltage by:
performing a Fast Fourier Transform (FFT) to determine real and imaginary components of a signal represented by the samples; and
determining the tangent of the phase shift of the voltage as a ratio of the real component of the signal represented by the samples to the imaginary component of the signal represented by the samples.

19. The touch screen controller of claim 18, wherein the processing circuitry is configured to directly calculate the tangent of the phase shift of the voltage by:
multiplying the samples by a real multiplier and by an imaginary multiplier;
summing the samples after multiplication to produce the signal represented by the samples;
determining real and imaginary components of the signal represented by the samples; and
determining the tangent of the phase shift of the voltage as the ratio of the real and imaginary components of the signal represented by the samples.

20. A method of touch sensing on a touch screen, the method comprising:
driving conductive lines with a drive signal; and
for each of the conductive lines, during a single touch sensing frame:
sampling a voltage at that conductive line to produce samples, the voltage being a function of a capacitance seen by that conductive line;
directly calculating a tangent of a phase shift of the voltage due to the capacitance from the samples; and
determining a touch value for that conductive line during the single touch sensing frame as a function of the tangent of the phase shift of the voltage.

21. The method of claim 20, wherein the tangent of the phase shift of the voltage is directly calculated by:
performing a Fast Fourier Transform (FFT) to determine real and imaginary components of a signal represented by the samples; and
calculating the tangent of the phase shift of the voltage as a ratio of the real component of the signal represented by the samples to the imaginary component of the signal represented by the samples.

22. The method of claim 21, wherein the tangent of the phase shift of the voltage is determined by:
multiplying the samples by a real multiplier and by an imaginary multiplier;
summing the samples after multiplication to produce the signal represented by the samples; and
calculating the tangent of the phase shift of the voltage as the ratio of the real and imaginary components of the signal represented by the samples.

* * * * *